Patented Apr. 29, 1947

2,419,909

UNITED STATES PATENT OFFICE 2,419,909

METHOD OF MAKING NATURAL COLORED FRUIT JUICE

Harry A. Noyes, Watertown, Mass.

No Drawing. Application June 29, 1944, Serial No. 542,834

4 Claims. (Cl. 99—205)

This invention relates to the production for commercial use and sale of fruit juices and concentrates which are associated in the minds of the consuming public with the characteristic colors of the fruits from which they are derived, but which of themselves have different colors or none at all. Illustrative examples of such fruits are red tomatoes and oranges, the characteristic colors of which are known to the entire purchasing public. The juices of these fruits, and of others in the category with which this invention is concerned, are radically different from the colors of the fruits themselves; clear tomato juice having a light straw color and that of orange juice being from slightly yellowish to nearly colorless. The more pronounced colors which are observed in juice derived from crushed tomatoes and reamed out oranges, without filtering the juice, are due to particles of the pulp in the juice.

The manufacturer of commercial orange drinks have used coal tar dyes, soluble colors and oils to give the desired orange color to preserved and bottled drinks made from that fruit. The red color of commercial tomato juice is due to the suspended particles of the fruit pulp which are released from the pulp in the preparation procedures as well as in the cooking procedure employed to give the juice desired keeping qualities. These colors are known and associated with the juice preparations by the consuming public and demanded by them.

My object is to furnish for the uses of commerce fruit juices of the class in which characteristic colors are given by suspended particles of pulp when freshly pressed from the fruit, such juices having keeping qualities substantially equal to those of cooked products, and in some instances being concentrated, and having the characteristic colors of the fruits from which they are derived, but without being cooked and without the addition of dyes. I call the juices which are produced in accordance with this invention "natural color" juices, meaning thereby that they have the colors of the fruits from which they are derived rather than those of the filtered juices. The invention comprises both new methods of producing such natural colored juices and juices resulting therefrom which have characteristics and qualities different from those of the fresh juices as pressed from the fruits.

By the way of illustration, I will describe one form of procedure as applied to tomato juice. The fresh ripe tomatoes are disintegrated and strained to separate, more or less, the seeds, skins and harder parts of the fruit from the juice, with the use of strainers of which the meshes are large enough to pass enough of the finely divided particles of the pulp to furnish red coloring for the juice. The juice resulting is placed in containers and frozen until it is substantially solid. Preferably the refrigerating effect is applied so that the frozen state occurs at substantially or nearly the same time throughout the body of juice being frozen, or at least at a number of focal points. This effect may be aided by agitating the liquid while heat is being extracted by externally located refrigerating means, or by locating refrigerating coils in a large body of juice, and when the freezing is done by immersed refrigerating coils, the liquid between the coil or coils and the walls of the container may be agitated while the whole body of liquid is being chilled to near the freezing point. This mode of heat extraction is mentioned to illustrate other than progressive freezing from the outside of the mass to the center with consequent accumulation of a highly concentrated solution of soluble solids at the center before the ultimate substantially solid state is produced.

By saying that the body of liquid is frozen substantially solid, I mean that it is brought to a state where the properties of a liquid cease to be evident in the frozen mass. This is a method of overcoming supersaturation and supercooling. The result is that the frozen mass consists of small crystals in coherent union with concentrations of the soluble solids and gels present in the juice interspersed among them. Heat is then added in amounts sufficient to affect the constitution of the substantially frozen mass but at such a rate that its action is effective substantially uniformly throughout the mass. Heat addition at first or later may be absorbed in latent heat of liquefaction, decrease in viscosity of gels etc. without attendant rise in the temperature of the mass. The frozen mass is thus raised in temperature to a point, lower than that of the freezing point of water, at which a concentrated fraction having a relatively low melting point is liquefied, and on each further addition of heat a less concentrated liquid solution of the juice constituents forms. The heat additions may be made by raising the temperature of the refrigerating agent, or in any other suitable ways, provided that the heat is applied at a rate sufficiently slow, and its temperature suitably limited, so that the heat is distributed in a substantially uniform manner throughout the mass and all parts yield liquid of substantially the same degree at a given time. The temperature to which the mass is thus raised may be brought to any degree at which a liquid solution of desired strength or concentration is produced. The liquid resulting inside the mass percolates through the ice mass and collects at the bottom to the extent the conditions allow the seeking of lower levels by the working of the law of gravity. In so flowing among the crystals and grains of ice, the liquid is strained and/or filtered of solid matter. This percolation of the liquid may continue over a period of hours or days, and the mass may be held at temperatures below the stable temperature at which water exists alone in the solid state until collection of liquid ceases. According to the degree to which the temperature of the mass is raised, the liquid resulting is more or less concentrated or relatively dilute; but in any case enough of the mass is retained unmelted to hold back solid pulp particles. This liquid is withdrawn from the container, leaving the residue of ice and entrapped pulp.

The residual ice is then melted and the water of liquefaction largely separated from the pulp. The pulp is then put through a colloid mill along with a minimum amount of liquid, that is, enough liquid only to make it freely fluid. The liquid may be water or the juice of the fruit, or a mixture of juice and pulp. Instead of employing a colloid mill, the pulp may be passed through a homogenizing machine or other apparatus which is effective to disintegrate it. The disintegrated pulp thereby produced may be largely colloidal in nature and yet have sufficient particles of large enough dimensions to give the natural color when added in such amounts as may be desired to the fruit products ultimately produced. Settling and floating are matters of both particle size and specific gravity in relation to the specific gravity of the liquid. Increased solubility of carbohydrate bodies, pectins and approximately colloidal size of particles may make the pulp substantially colloidal, in which case the coloring matter does not settle out even after long periods of storage.

Fresh orange juice is treated in substantially the same way. Most of the color of fresh orange juice is due to bits of the pulp of the orange that are floating in the juice. Most of such particles passed with the juice through a coarse strainer separate and collect at the top of a quantity of juice which has been allowed to remain quiet for more than a few minutes. In my procedure, the juice is squeezed or reamed from the orange skins and separated from seeds and membranes by the use of strainers or other separating agencies which allow a great part of the colored pulp material to pass with the liquid. The juice mixture so produced is frozen to substantial solidity throughout, a juice concentrate is separated and withdrawn from the ice, the remaining ice is melted, and the pulp residue is disintegrated to minute particle size and added to the juice concentrate as described with respect to tomatoes.

Other fruit juices which depend on the pulp of the fruit for the colors demanded by consumers are produced in the same way. The invention is not limited to tomatoes and oranges, but includes all fruits of the character hereinbefore indicated.

By means of this invention a fruit juice product is furnished which has the natural color of the fruit, and the fresh fruit flavor, unaffected by any cooking procedure. It does not depend on dyes or other foreign matter for its color in the state in which it is purveyed to the public.

However, I may enhance or modify the color effect by adding to the juice clean and edible vegetable matter other than the pulp of the fruit from which the juice is derived, such as parts of the outer layer of orange skins that have been reduced to fine particles more or less closely approaching colloidal particle size. In its broader aspects, therefore, that phase of the invention which concerns coloring of the juice includes the imparting of color by the vegetable particles derived from other sources than the pulp of the fruit.

This application is a continuation in part of my prior application Serial No. 354,253, filed August 26, 1940, entitled "Treating plant products," on which Patent No. 2,395,498 was granted to me February 26, 1946. In respect to the steps of freezing of a body of juice containing pulp material to substantial solidity, liquefying a concentrated fraction of the juice by controlled addition of heat to the frozen mass, and adding to the juice concentrate the pulp recovered from the residual ice, it is a continuation, and the step of finely dividing the pulp in a colloid mill or by equivalent means, before adding it to the juice, is new. This step of disintegration may be performed with pulp-containing juices where the extracted juice is separated from the pulp otherwise than by refrigerational concentration, as by filtration for instance or any other suitable means. The pulp is collected separately and disintegrated by itself in a colloid mill or other homogenizing apparatus, and the disintegrated pulp and separated juice are mixed in such proportions as serve to give the desired color effect. In the generic aspect of the invention, the separation of juice from pulp by the freezing and thawing procedure described is one of several ways by which such separation can be effected.

The finished product may be bottled or otherwise put up for marketing, and may be pasteurized or otherwise treated to prevent deterioration.

What I claim and desire to secure by Letters Patent is:

1. The method of producing a fruit juice concentrate having a desired color characteristic, which consists in extracting juice from the fruit, freezing a body of such juice to substantial solidity, applying heat to the frozen mass with control of temperature and rate of heat input such that the whole mass is substantially uniformly raised in temperature to a degree, lower than the freezing point of water, at which a fraction having a relatively low melting point is liquefied, separating the liquefied fraction from the frozen remainder of the mass, and adding to the liquid so obtained a quantity of edible vegetable solid matter in a state of subdivision sufficiently fine to remain in suspension in the liquid for an indefinite period of time.

2. The method of producing a natural colored juice product from a fruit of which the clear juice has a different color characteristic from the pulp of the fruit, which consists in disintegrating such fruit, separating juice and pulp from refuse matter of the disintegrated fruit, freezing a quantity of the juice and pulp together to a substantially solid mass, applying heat to the frozen mass with control of temperature and rate of input such that the mass is substantially uniformly raised in temperature to a point, below the freezing point of water, at which a concentrated fraction of the juice liquefies, withdrawing the liquid fraction so produced from the residual ice of the mass so that the pulp is filtered from the liquid by the ice, melting the residual ice and separating the water of liquefaction from the pulp, and adding the pulp from which the water has been separated to the juice concentrate first withdrawn.

3. The method of producing a natural colored juice product from a fruit of which the clear juice has a different color characteristic from the pulp of the fruit, which consists in separating juice and a portion of the pulp from the refuse matter, freezing a quantity of the juice and pulp together to a substantially solid mass, applying heat to the frozen mass with control of temperature and rate of input such that the mass is substantially uniformly raised in temperature to a point, below the freezing point of water, at which a concentrated fraction of the juice liquefies, withdrawing the liquid fraction so produced from the residual ice of the mass so that the pulp is filtered from the liquid by the ice, subdividing the separated pulp to a particle size sufficiently small to remain in suspension for an indefinite time in the liquid when added thereto, and mixing a quantity of the subdivided pulp with the separated concentrated juice.

4. The method of obtaining a concentrated extract of tomato juice, which consists in separating juice with a quantity of the pulp from ripe tomatoes, rapidly cooling the juice and pulp immediately after separation to approximately the freezing temperature of the juice, placing the cooled juice and pulp mixture in a container and further chilling it until it is substantially solid throughout, adding heat at a rate and in an amount such that the effects of heat are distributed substantially uniformly throughout the frozen mass and a concentrated solution of constituents of the juice is liquefied, draining the liquid produced thereby from the unmelted ice remainder of the mass, separately melting the ice, separating the water of liquefaction from the residue of tomato pulp left intermingled with the ice after draining the melted juice fraction therefrom and combining the recovered pulp with said juice fraction.

HARRY A. NOYES.

REFERENCES CITED

The following references are of record in the file of this patent:

UNITED STATES PATENTS

| Number | Name | Date |
|---|---|---|
| 761,387 | Monti | May 31, 1904 |
| 919,616 | Monti | Apr. 27, 1909 |
| 1,362,868 | Johnson | Dec. 21, 1920 |
| 1,379,470 | Monti | May 24, 1921 |
| 1,529,431 | Gusmer | Mar. 10, 1925 |
| 1,562,309 | Dickerson | Nov. 17, 1925 |
| 1,746,657 | Kemp | Feb. 11, 1930 |
| 1,955,849 | Finley | Apr. 24, 1934 |
| 2,137,205 | Cowgill | Nov. 15, 1938 |
| 2,182,829 | Thomas | Dec. 12, 1939 |
| 2,182,887 | Steinbacker | Jan. 19, 1940 |